July 14, 1959  R. B. MYERS  2,894,632
DRUM DISC FILTER
Filed April 11, 1957  3 Sheets-Sheet 3
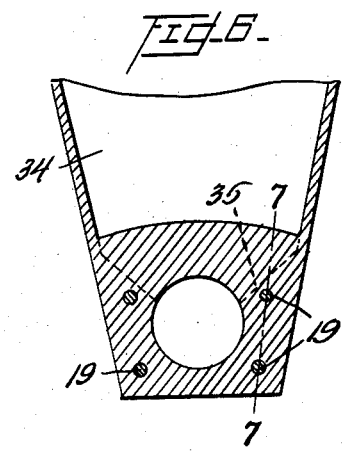
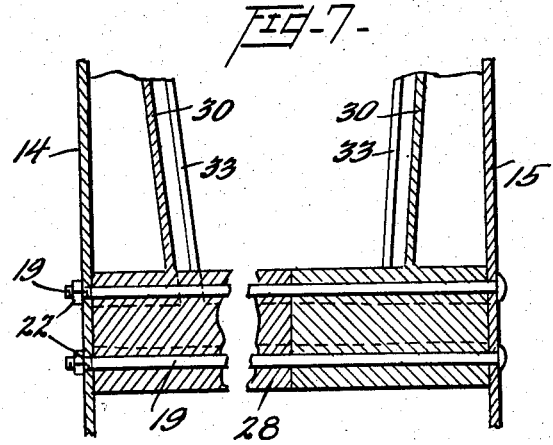
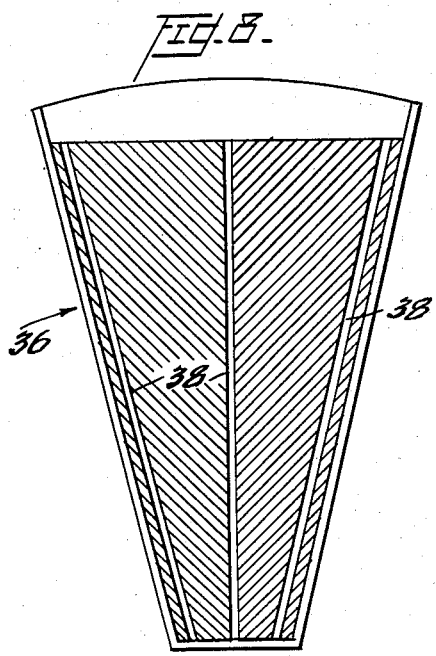
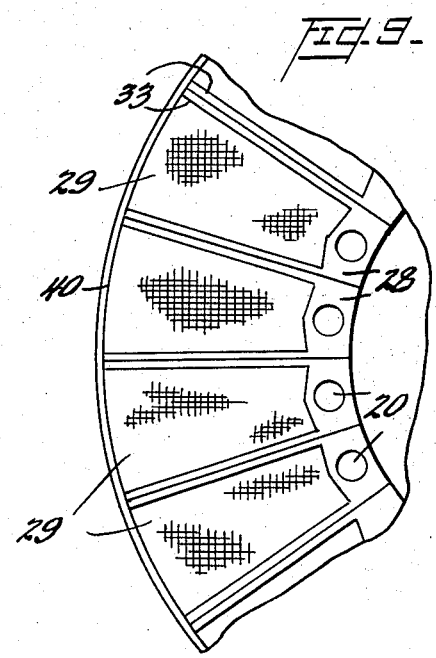
Robert B. Myers
INVENTOR
BY
ATTORNEY

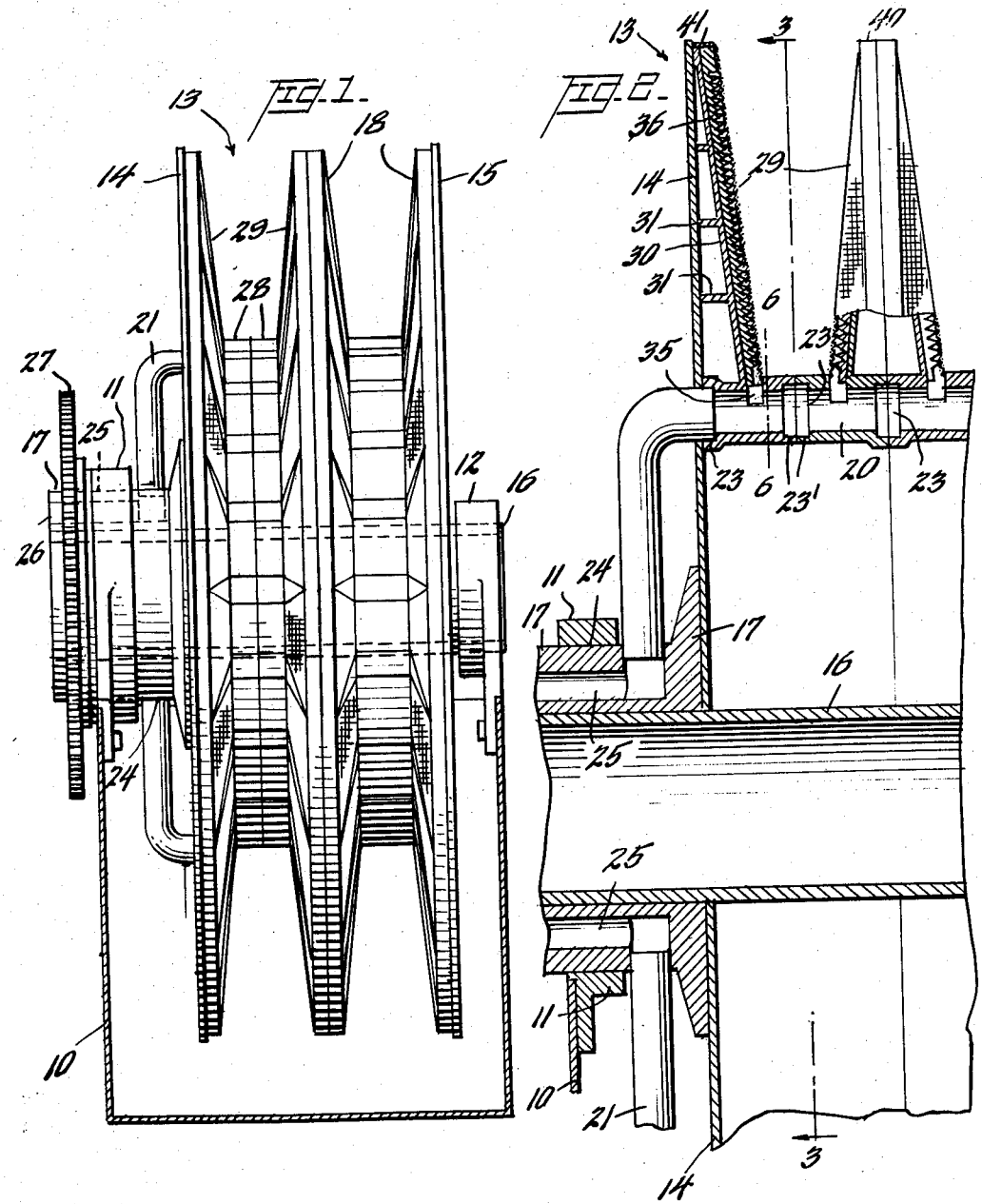

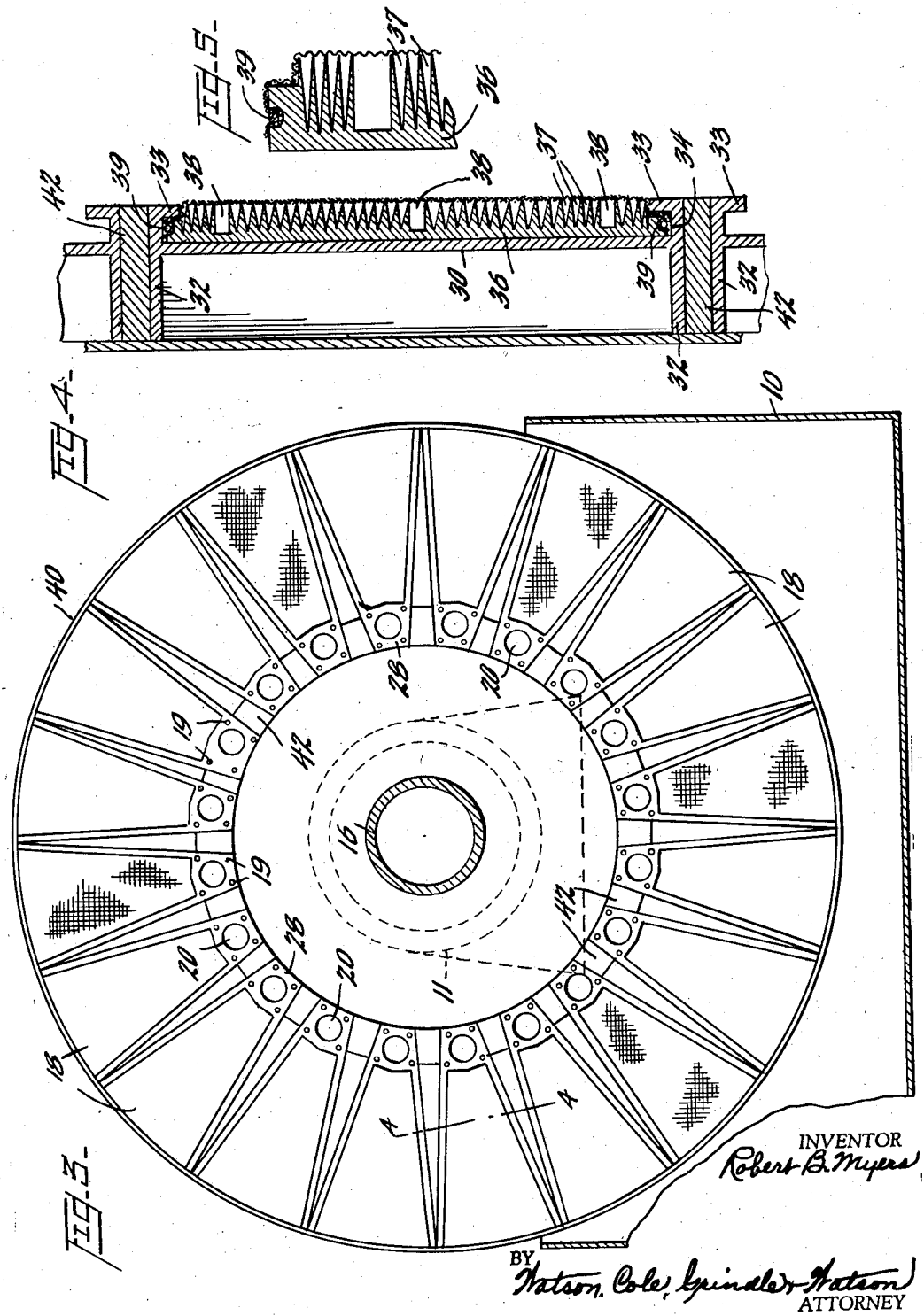

United States Patent Office 2,894,632
Patented July 14, 1959

2,894,632
DRUM DISC FILTER

Robert B. Myers, North Branch Depot, N.J., assignor to Komline-Sanderson Engineering Corporation, Peapack, N.J., a corporation of New Jersey Application April 11, 1957, Serial No. 652,260

9 Claims. (Cl. 210—331)

This invention relates to a rotary filter unit constructed of a plurality of filter segments, and to improvements in the segments per se as well as to a novel method of assembling such a unit.

It has been known to mount individual filter segments in axial rows on filtrate pipes constituting portions of a drum skeleton. While this has permitted the construction of filter units of varying diameters and lengths, from generally similar filter segments, it has necessitated that the segments and pipes be carefully oriented with each other in order to place the filter segment drainage passages in communication with inlet ports in the pipes.

With the foregoing in mind the present invention has for its primary object to provide a filter unit constructed of a plurality of filter segments, in which the said supporting pipes, and the complications arising from their use, are completely eliminated. In accordance with the present invention, the filter segments are arranged in coaxial rings, with the segments of the respective rings in axial registry, and having axially registering conduit sections therethrough communicating with the filter media of the respective segments. These rings are axially clamped and supported between coaxially rotatable end discs to define the filter unit, and the axial clamping pressure is relied upon to couple the registering filter passage sections of each axial stack of segments in fluid tight communication.

A further feature of the invention consists in utilizing one of the clamping end discs to close and in effect seal the corresponding ends of the filtrate conduits.

Moreover, the other said end disc may have a plurality of filtrate conduits carried thereby externally of the filter unit for ready accessibility but opening through said disc and held by the clamping action in communication with the respective filtrate passages. These conduits are used to place the filtrate passages in communication with any usual filtrate valve or manifold structure.

In accordance with a further feature of the invention the filter segments are adapted for assembly into filter units of varying axial and diametric proportions, without any modification whatsoever in said segments or their filtrate passages.

Also, the filter segments per se are of novel construction, each preferably including an integral plastic or cast metal body portion, having an interior recess communicating with its filtrate passage, and a separately formed filter insert positioned over the mouth of said recess, so that in the assembled condition of the filter unit the said inserts may be individually radially removed and replaced to facilitate servicing and repairing of the unit.

Where the segments are employed to form a unit of larger than the minimum diameter permitted by the angular disposition of their adjoining side edges, the resulting space between said edges may be occupied by suitable wedges or fillers, serving to impart a smooth continuous surface for cooperation with a scraper, and also serving to impart circumferential stability to the outer ends of the respective segments.

The foregoing objects and advantages are attained by the preferred embodiment of the invention, illustrated in the accompanying drawings, in which:

Figure 1 is a front elevation of a filter unit, constructed in accordance with the invention, the associated tank for said unit being shown in vertical section;

Figure 2 is an enlarged vertical diametrical section through a portion of the filter unit shown in Figure 1;

Figure 3 is a section on the line 3—3 of Figure 2;

Figure 4 is a section on the line 4—4 of Figure 3;

Figure 5 is an enlarged fragmentary section through the upper end of the removable filter tray, taken in the same plane as Figure 4;

Figure 6 is an enlarged fragmentary section on the line 6—6 of Figure 2, with the filter trays or inserts removed;

Figure 7 is a section on the line 7—7 of Figure 6;

Figure 8 is a plan view of one of the filter trays or inserts with its porous cover removed;

Figure 9 is a fragmentary end elevation of a filter unit constructed of minimum diameter permitted by the angular relationship of the side edges of the filter segments, the side edges thus being in contiguous relationship and requiring no filters or wedges therebetween.

Referring now in detail to the accompanying drawings, and particularly to Figures 1 and 2, the filter unit shown therein by way of exemplification includes a conventional tank 10 for holding a mixture of the liquid and solids to be filtered. Supported in bearings 11 and 12 on opposite sides of the tank is the rotary filter element or unit designated 13 in its entirety. It will be seen that the filter unit 13 is thus supported in the bearings 11 and 12 for rotation into and out of the liquid and solid mixture within the tank in accordance with usual practice in rotary vacuum and pressure type units.

The filter unit 13 per se comprises rigid end discs or backing plates 14 and 15, respectively, which are mounted in axially spaced relation on a supporting shaft 16. Shaft 16 may conveniently comprise a length of pipe of suitable proportions having one end rotatably journalled in the bearing 12. A filtrate valve or manifold 17 concentrically fixed on the other end of said pipe is rotatably journalled in bearing 11 to provide a rotatable support for its respective end of the filter unit.

Between the end plates 14 and 15 are supported a plurality of stacks of axially aligned wedge shaped filter segments 18 supported by and axially clamped between the discs 14 and 15, with the said stacks in concentric cylindrical formation about the rotational axis of the filter unit. Otherwise stated, it will be seen that there are provided a plurality of rings of filter segments 18 clamped coaxially between the end discs of plates 14, 15 with the segments of the respective rings in axial registry.

Such clamping of the segments may be readily achieved by tie rods 19 (Figures 3 and 7) axially interconnecting the discs 14, 15 through each stack of segments, and also serving to maintain the angular and radial positions of the respective segments. Each segment has formed therethrough a section of a filtrate passage 20 and these are disposed in registering relation to form a continuous axial fluid passage 20, which is closed at one end of the unit 13 by end disc 15. Each passage 20 communicates with an exterior filtrate conduit 21 through an opening in disc 14.

Nuts threaded on the ends of the tie rods may be turned tight to apply a clamping pressure to the several axially adjoining segments 13 to press them into fluid tight abutting relation with each other, and to thereby maintain the filtrate passage sections of each axially aligned stack in fluid tight communication. The efficiency of the connections between adjoining sections of each passage 20 may be improved as shown in Figure 2, by means of coupling sleeves 23, one of which is disposed in oppositely facing counterbores 23' in adjoining sections of each passage 20. These coupling sleeves preferably are of a resiliently compressible material such as rubber, neoprene or the like, and compressed axially between the end flanges of their associated counterbores. Preferably the counterbores 23' adjacent the conduits 21 receive the slightly projecting ends of said conduits and are maintained in fluid tight communication with said conduits by the axial clamping action of the discs 14 and 15. It will be seen that the conduits 21 connect the respective passages to the rotor portion or manifold 24 of a filtrate valve. The valve rotor or manifold 24 may be of any usual construction. The illustrated form of such rotor is formed with a series of axially opening passages 25 communicating at their inner ends with the respective conduits 21 and in effect constituting extensions of the respective filtrate passages 20.

It will be understood that the passages 25 of the valve body open through the radial end face 26 of the valve rotor, for registry with suitably located passages in a cooperating stationary valve member which, being of conventional construction, is not here illustrated. However, reference is made to U.S. Patent 2,022,069 to Whitmore, November 26, 1935, for a suitable exemplification of such a valve. In accordance with usual practice, the stationary valve member will have a suitably disposed filtrate passage or passages for registry with the passages 25 during appropriate portions of the rotation of the filter unit 13. Where the unit 13 is adapted for pressure filtering these may merely constitute drain passages. However, for vacuum filtering a suction may be transmitted through such passages to the filter unit, and thence at least to such portions of the unit 13 as are immersed in the liquid and solid mixture in tank 10 at any given time.

Also as is known in the art such a valve may connect the passages 20 to a compressed air source at suitable times to remove solid materials from the pores of the filtering media.

Rotary movement may be readily imparted to the filter unit 13, by means exemplified by the sprocket wheel 27 fixed on valve rotor 19. (See Figure 1.)

In the preferred embodiment of the invention each filter segment 18 comprises an integral body of generally sector shape having an axially projecting segmental hub portion 28 for spacing its respective filtering surface 29 from that of the next axially adjoining segment, and a generally flat radially inclined web 30 (Figure 2) which may be stiffened and reinforced by suitably disposed ribs 31 and a marginal flange 32 on its rear face. The rear edges of said ribs and said flange all lie in a common plane which will normally be coincident with a radial plane through the unit. This facilitates positioning of adjacent segments in flush back-to-back relation as shown in the drawings and also the disposition of the end segments with their backs in flush engagement with the respective end discs 14 and 15.

As thus disposed axially adjoining segments have their filtering surfaces 29 presented in opposite axial directions and the same is, of course, true as to the several rings of such segments. Thus it will be seen that the segments in their preferred arrangement will define generally a cylinder or drum having its overall filtering surface defined by a series of annular ridges or corrugations which substantially increase the filtering area and capacity of the unit as compared to a conventional drum type unit having a cylindrical filtering surface. Moreover, the individual segments, as above described, are well adapted for economical production largely by usual plastic or metal molding operations.

Projecting forwardly of the web 30 of each body at the opposite marginal edges thereof are oppositely channeled guides or groove defining elements 33 which define the opposite sides of the mouth of a filtering recess or hollow 34 in the body. At its radially inner end it will be seen that each such recess communicates through a radial passage 35 with the filtrate passage section 20' of its respective body.

Radially removable filter trays or panels 36, as shown in Figures 4, 5 and 8, respectively, conforming in shape and size to the mouths of the respective recesses 34, are radially slidable into and from the guides 33 at the mouth of each recess. Essentially each of these may comprise a suitable panel or tray of wedge shape, having a series of grooves or indentations 37 preferably communicating with one or more drainage channels 38 which in turn communicate with the radial passage 35 leading to the filtrate passage 20. The filtering area 29 of each segment is defined by a suitable flexible and porous filter media which is supported over the channeled face of each filter tray and thus over the mouth of the recess 34, as by means of a drawstring 39 (Figures 4 and 5) which retain the marginal edges of such filter media into a peripheral groove around the filter tray. Thus, filtrate passing through the filter media 29 will run through the drainage grooves 37 and channels 38, and thence through the opening or passage 35 into the filtrate passage 20.

By virtue of the radially inwardly converging relation of the guides 33 and the correspondingly converging relation of the opposite sides of the filter trays 36, it will be apparent that the trays may be wedged into fluid tight relation over the mouths of their respective filter segments with the radially inner edge of each tray and its filter media received in and communicating with the passage or port 35 of its segment body.

Retention of these trays in their respective filter segments may be readily achieved by encircling bands 40 and 41. Removal of such bands will obviously permit rapid removal and replacement of any of the filter trays 36 without dismantling the portions of the filter unit 13, and with but a minimum discontinuance of its operation.

A particular advantage of the invention arises due to the fact that any number of stacks of segments may be arranged to form a unit 13 of any desired diameter, merely by adjusting the diameter of the unit to accommodate the desired number of such stacks, and the requisite number of suitably arranged filtrate passages 20 will be formed automatically as an incident to such arrangement. The only changes necessitated for this will consist in varying the diameter of the end discs and the radial location of the tie rods and conduits 21 in obvious manner.

Where the segments are combined to form a unit of minimum diameter, as in Figure 9, their radial edges will be contiguous. However, where they are arranged to define a unit of larger than minimum size, the resulting angular gaps between adjoining segments may be filled by suitable wedges or spacers 42, as in Figure 3, to provide smooth, continuous filtering faces on the respective rings of segments. Such smooth faces facilitate the removal of the filter cake by a conventional scraper blade, and prevent the accumulation of solids between the segments. However, these fillers may be dispensed with if desired.

In addition, the invention makes possible the forming of the filter segments into a unit of any desired axial extent. For instance, in order to form a unit of minimum length it is necessary only to mount one ring of the segments 18 between the discs 14 and 15. For units of greater length obviously any desired number of rings of segments may be assembled between the same set of discs 14 and 15 without any changes or modifications of any of the component parts employed.

If desired, the radially outer ends of the filter segment bodies 18 and of their associated trays 36 may be initially formed as straight edges, and then formed to an arc appropriate to the diameter of the completed filter unit 13 by a suitable turning operation on the assembled unit.

The overall operation of the invention is believed to be readily apparent from the foregoing description, it being obvious that where the unit 13 is used either as a vacuum type or pressure type unit 13 it will be continuously rotated through a flexible drive to sprocket 27 with its lower portion in the liquid-solid mixture in the tank 10. During the time that the respective filter segments are immersed in the contents of the tank part of the liquid portion of such contents will pass through the filtering surfaces 29 thence through the drainage channels 38 (see Figure 8) and through the opening or port 35 of each unit into the filtrate passage 20. It will be seen that at this time suction may be applied through the filtrate valve ports 26 to the filtrate passages 20 of the immersed segments to draw the liquid filtrate through the filter surfaces 29 in the event the unit is of the vacuum type, whereas in the case of a pressure type unit there will be caused a pressure differential causing a greater pressure on the outside of the filtering surfaces 29 and thus having the same result. The solid materials are thus deposited in the form of a filter cake on the outer face of the filtering surfaces 29 to be removed by suitable scrapers, which are not shown due to their being well known in the art. However, in accordance with usual practice, the filter cake is not removed by such scrapers until after the respective filtering segments have rotated out of the liquid-solid mixture in the tank and the filter cake has been substantially solidified by the continuing action of the suction or pressure as the case might be drawing a certain portion of the residual fluid content of the filter cake into the segments.

It will be readily apparent that the present invention makes possible the formation of filtering units of varying diameters and varying axial dimensions from a plurality of identical hollow filter segments by arranging such segments in a plurality of axial stacks of equal numbers of segments arranged with their filtrate passages in alignment, then arranging such stacks in relatively uniformly angularly spaced cylindrical conformation and clamping said stacks of segments axially together between the end plates 14 and 15 to establish fluid type communication between the respectively aligned passages in each such stack. The spacers or wedges may be applied where desired, as explained above.

In this application there is shown only the preferred embodiment of the invention simply by way of illustration of the preferred mode of carrying out the invention. However, the invention is obviously capable of various embodiments other than that shown and similarly its several details may be modified in various ways all without departing from the invention. Accordingly, the drawings and description herein are to be construed merely as illustrative in nature and not as restrictive.

Having thus described the invention, I claim:

1. A rotary filter comprising a pair of rigid discs, a plurality of rings of filter segments of similar diameter clamped between said discs in coaxial relation with said discs and with each other, each said ring comprising a similar plurality of annularly arranged segments, each said segment including at the radially inner end a hub portion integral therewith and projecting axially beyond the remainder of said segment to maintain the remainder thereof in axially spaced relation from an adjoining segment, the segments of the respective rings being in angular registry with each other, tie rods axially interconnecting said discs through the hub portions of the respective segments and maintaining the angular and radial positions of said segments while maintaining said discs and the hub portions of said segments in axially contiguous relation, each set of axially adjoining angularly registering segments having an axial filtrate passage formed through and defined solely by the hub portions thereof and establishing communication axially through said hub portions, each said segment being formed with an opening communicating with said filtrate passage, and a filter media normally fixed across said opening.

2. The combination of claim 1 wherein one of said discs closes the adjacent end of said filtrate passages, a plurality of filtrate conduits communicating with the respective passages through the other said disc.

3. A rotary filter comprising a pair of rigid discs, means supporting said discs for rotation about their centers, a plurality of rings of filter segments of similar diameter clamped between said discs in coaxial relation with said discs and with each other, each said ring comprising a similar plurality of annularly arranged segments, the segments of the respective rings being in angular registry with each other, tie rods axially interconnecting said discs through the respective segments and maintaining the angular and radial positions of said segments, thereby drawing said segments into mutually contiguous axial abutment, each set of axially adjoining angularly registering segments having an axial filtrate passage formed therethrough, each said segment being formed with an opening communicating with said filtrate passage, and a filter media normally fixed across said opening, in combination with a filtrate manifold mounted for rotation with said discs and communicating with the respective filtrate passages through one of said discs.

4. A rotary filter comprising a pair of rigid discs, a plurality of rings of hollow filter segments of similar diameter clamped between said discs in coaxial relation with said discs and with each other, each said segment being defined at least in part by a porous filtering area, each said ring comprising a similar plurality of annularly arranged segments, the segments of the respective rings being in angular registry with each other, means axially interconnecting and clamping the said discs axially against the said rings of segments therebetween, each set of axially adjoining angularly registering segments having an axial filtrate passage formed therethrough, the hollow interior of each said segment communicating with said filter passage.

5. A rotary filter comprising a pair of rigid discs mounted for rotation in spaced coaxial relation, a stack of relatively axially aligned hollow filter segments supported and axially clamped between said discs, tie rods extending through said segments and between said plates and maintaining the latter in axial clamping relation with the segments, each said segment being formed with a generally axial passage therethrough, said passages being in interconnected registering relation to define a common filtrate passage for said stack of segments, one end of said passage being closed by one said disc, the other said disc having an opening therethrough in communication with said passage.

6. The combination of claim 5, including a plurality of said stacks of segments supported in cylindrical formation between said discs.

7. A rotary filter comprising a rigid disc and means supporting said disc for rotation about its center, a plurality of filter segments secured in fluid tight relation against one axial face of said disc, in annular formation concentric to the rotational axis of said disc, each said segment being formed with a recess having a mouth opening axially away from said disc, the opposite sides of the mouth of said recess being defined by opposed linear grooves in said segment, said grooves diverging radially upwardly relative to each other in a substantially radial plane relative to said rotational axis, a replaceable filter element having opposed linear edges radially slidably received in said grooves, said element including a porous filter media normally covering the mouth of said recess, each said segment being formed with an axially extending filtrate passage therethrough in communication with said filter media.

8. The combination of claim 7 including a filtrate manifold fixed to said disc on the opposite axial side thereof from said segments, and communicating with each of said passages through openings formed in said disc.

9. The combination of claim 7 wherein adjoining segments on said disc are in uniformly circumferentially spaced relation, wedge shaped fillers being conformably disposed in the space between said segments and having axially presented surfaces flush with the respective filter panels for therewith defining a continuous smooth annular surface for coaction with scraper means.

References Cited in the file of this patent
UNITED STATES PATENTS

| | | |
|---|---|---|
| 445,223 | Knight | Jan. 27, 1891 |
| 712,047 | Dean | Oct. 28, 1902 |
| 1,036,847 | Holland | Aug. 27, 1912 |
| 1,538,980 | Genter | May 26, 1925 |
| 1,768,167 | Sweetland | Jan. 24, 1930 |
| 2,022,069 | Whitmore | Nov. 26, 1935 |
| 2,434,807 | Little | Jan. 20, 1948 |
| 2,772,000 | Hunziker | Nov. 27, 1956 |